Aug. 10, 1948.                S. T. HENDERSON                 2,446,764
                                CATHODE RAY TUBE
                               Filed July 19, 1945
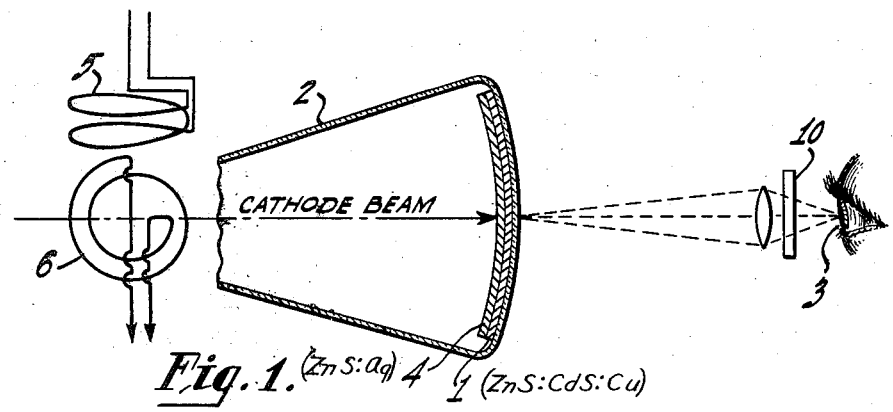
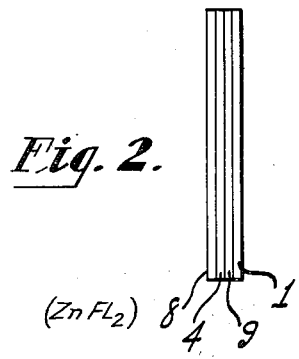
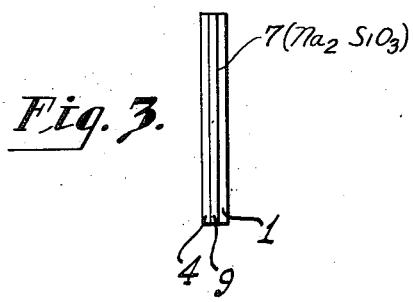
INVENTOR.
STANLEY T. HENDERSON
BY
       H. G. Grover
              ATTORNEY Patented Aug. 10, 1948

2,446,764

UNITED STATES PATENT OFFICE 2,446,764

CATHODE-RAY TUBE

Stanley Thomas Henderson, Buckinghamshire, England, assignor to Electric & Musical Industries Limited, Hayes, Middlesex, England Application July 19, 1945, Serial No. 605,968
In Great Britain April 21, 1944

Section 1, Public Law 690, August 8, 1946
Patent expires April 21, 1964

3 Claims. (Cl. 250—164)

This invention relates to cathode beam tubes having fluorescent screens of the kind which are adapted to emit light when excited by electron bombardment.

Such screens are employed in cathode tubes used in radar equipment and may serve to indicate the position of a target when the screen is illuminated on the receipt of a reflected signal. When electromagnetic waves are radiated, reflections occur not only from moving objects, such as aircraft, but also from reflecting stationary objects, such as buildings, which may be in the path of the radiated waves. It is therefore desirable to be able to distinguish on the screen of the cathode beam tube light spots due to reflections received from moving objects and light spots due to reflections received from relatively stationary objects.

It will be appreciated that successive signals received from stationary objects will cause illumination of the same elemental areas on the screen while successive signals received from moving objects will cause illumination of different elemental areas thereon. Thus, in effect, signals from stationary objects excite a spot on the screen for a longer duration than signals from moving objects. In order therefore to enable ready distinction to be obtained between signals received from moving and stationary objects the present invention seeks to provide an improved screen which is adapted to emit light of one color when a spot thereon is excited for a plurality of times and light of a different color when a spot thereon is excited for a smaller number of times.

It is usual in radar equipment to employ a screen in the tube which has a long time lag, or afterglow, that is to say, a screen in which light is emitted for a considerable time after excitation by the cathode ray beam, so that the spot on the screen is visible for a period comparable with that between successive scans of the screen. The frame period may be of several seconds duration and in order to obtain a long lag screen it is usual to employ a phosphor in which, provided the period of the frame scan is shorter than the period of the time lag of the phosphor, the phenomenon known as "build up of illumination" is observed in which light from the screen reaching the eye of the observer obtains its maximum brightness of afterglow only after the same point on the screen has been scanned or excited several times, such as will occur when signals are received from stationary objects. The "time lag" of such a screen is defined as the time taken for the visible phosphorescence of the phosphor to decay substantially to zero. Such phosphors sometimes phosphoresce for hours or days, but such phosphorescence is so small that it is substantially invisible and for practical purposes it is regarded as substantially zero. It is an object of the present invention to employ a long lag phosphor which exhibits a "build up of illumination" in conjunction with a phosphor having a shorter time lag which emits light of a different color.

Another object is to provide a cathode beam screen for radar tubes in which signals from stationary objects produce one color on the screen and those from moving objects produce a different color.

Other objects will appear in the following description, with reference to the drawing, in which:

Figure 1 is a schematic illustration of one form of the invention.

Figure 2 is a similar illustration of another form.

Figure 3 illustrates a different form of the invention.

According to the present invention, there is provided a cathode beam tube having a fluorescent screen comprising a phosphor having a long time lag capable of exhibiting a "build up" effect if scanned during a frame scan period which is shorter than the time lag of the said phosphor and another phosphor having a shorter time lag which emits light of a different color from the light emitted by said first phosphor, the arrangement being such that said screen emits light of one color when a spot thereon is excited a plurality of times and light of a different color when a spot thereon is excited a smaller number of times.

Preferably, the phosphor having the long time lag is a composite phosphor composed of a phosphor layer disposed so as to be excited by the beam of the tube and another phosphor layer disposed so as to be excited by the light emitted from the first-mentioned layer. The first phosphor layer may emit blue light when excited by the beam and the second phosphor layer may emit green or yellow light when excited by blue light. The shorter lag component of the screen is excitable by the beam only and may be a fluoride of magnesium or fluorides of magnesium, zinc and beryllium, or another metal or metals of the second group of the periodic system, activated by manganese. When such a screen is employed in radar equipment, successive reflected signals received from a relatively stationary object will be visible as a spot of one color, while successive reflected signals from a moving object will be visible as spots of a different color from the spot illuminated by signals from a stationary object. As above mentioned, the same spot on the screen will be scanned several times if the reflected signals illuminating the spot is being received from a stationary object and build up of illumination as above mentioned will occur and the proportion of light such as green light reaching the eye of the observer from the long lag component of the screen will be substantially more than the proportion of light, such as orange light, reaching the observer from the short lag component of the screen. This mixture of light gives a certain color. On the other hand, if a reflected signal is received from a moving object, then build-up will not occur to such a great extent, with the result that the proportion of green light reaching the observer from the long lag screen will be less, while the proportion of orange light reaching the observer from the short lag screen will be much the same. This mixture of light gives a different color and hence a color contrast between the signals from stationary and moving objects will be obtained.

In one example of screen in accordance with the invention, the phosphor layer 1 inside the evacuated envelope 2 closest to the eye 3 of the observer is composed of zinc or zinc cadmium sulphide with from zero to 10% of cadmium sulphide and activated by copper, with or without other activators, and crystallized by furnacing with suitable fluxes. In the cathode beam tube, such material is made to fluoresce by a superimposed layer 4 of a phosphor which emits blue light under electron bombardment. Such a material is zinc sulphide activated by silver. It may be desirable to make the build-up period as slow as possible between successive frame scans produced by scanning coils 5, 6 by ensuring that the light-excited layer is excited entirely by blue light and not by electrons, in which case an intermediate layer 7 of some material transparent to blue light, but impervious to electrons, may be employed as indicated in Fig. 3. Such an intermediate layer may be one composed of sodium or potassium silicate. The phosphor having the shorter time lag is a fluoride of magnesium or a fluoride of magnesium with fluoride of zinc, beryllium or another metal or metals of the second group of the periodic system, activated by manganese. The phosphor of shorter time lag may be mixed with the blue-emitting phosphor and deposited with it on the phosphor layer 1 of Fig. 1, or it may be deposited as a separate layer 8 on top of the blue-emitting phosphor layer 4 as indicated in Fig. 2, or as an intermediate layer 9 between the two layers 1 and 4 of the long lag phosphor as indicated in Fig. 3.

In general, the blue light is not all absorbed by the layer which is excited by the blue light and to minimize or eliminate the disturbing effect of what is called the blue "flash" a yellow color filter 10 may be used. "Flash" is a term employed to indicate the maximum brightness observed by the eye as the electron beam passes over a spot on the screen. "Flash" is not equal to maximum brightness of the spot as measured by physical means, since the eye apparently integrates the light flux over a period of perhaps one-tenth of a second from the time when the electron beam first strikes the point in question. The electron beam will, in general, pass over the point in a few microseconds, during which period the brightness rises steeply and then the decay period commences and lasts until the electron beam passes over the same point again. The eye thus assesses the "flash" in terms of the light emitted when the spot is excited by the beam and that emitted during a short time of the decay period.

In employing the present invention, the short time lag component of the screen is preferably such that the light emitted from such material under electron bombardment is visible for a period somewhat greater than the "flash" period as above defined, so as to enable the observer readily to detect the presence of a light spot from a moving object before the color contrast has disappeared. The contrast should persist in an easily recognizable form for some time after the "flash" period and preferably for at least half a frame period, the frame period in a tube according to the invention preferably being 1 to 5 seconds. Assuming that the long lag component emits green light and the short lag component emits orange light, a spot illuminated by a signal from a stationary object will have the same amount of orange light but much more green light, since the build-up effect will occur owing to the repeated scanning of the same spot.

Some of the fluoride phosphors at present known have a decay after excitation approximating an exponential form with a half-life of the order of one-tenth of a second. These show good color contrast in the "flash" period but short persistence of contrast after the "flash" period. In order to improve the afterglow, a fluoride phosphor may be prepared by heating magnesium fluoride at 900° C. with a mixture of soluble salts of zinc, beryllium and manganese, the mixture being afterwards ground and washed free of soluble salts.

Although the invention has been described as applied to a screen for a cathode beam tube for use in radar equipment, it is to be understood that the invention is not to be limited to such use.

Having now particularly described and ascertained the nature of my said invention and in what manner the same is to be performed, I declare that what I claim is:

1. A cathode beam tube having a fluorescent screen comprising a phosphor adapted to be excited by the beam and having a sufficiently long time lag to produce a build-up of illumination by scansions at a frame scan period shorter than the time lag of the said phosphor and another phosphor adapted to be excited by the light from the first phosphor and having a shorter time lag and adapted to emit light of a different color from the light emitted by said first phosphor, whereby the elemental areas of said screen emit light of one color when successively excited a plurality of times and light of a different color when excited a smaller number of times.

2. A cathode beam tube according to claim 1, wherein the layer of said composite phosphor excited by the beam is zinc sulphide activated by silver and the other layer thereof is a sulphide of zinc activated by copper.

3. A cathode beam tube according to claim 1, wherein said phosphor of shorter time lag is a fluoride of a member of the group from the group consisting of magnesium, zinc and beryllium and mixtures thereof and manganese in activator proportions.

STANLEY THOMAS HENDERSON.

REFERENCES CITED

The following references are of record in the file of this patent:

UNITED STATES PATENTS

| Number | Name | Date |
| --- | --- | --- |
| 2,403,227 | Leverenz | July 2, 1946 |